United States Patent
Lanman et al.

(10) Patent No.: US 11,106,276 B2
(45) Date of Patent: Aug. 31, 2021

(54) FOCUS ADJUSTING HEADSET

(71) Applicant: Facebook Technologies, LLC, Menlo Park, CA (US)

(72) Inventors: Douglas Robert Lanman, Bellevue, WA (US); Alexander Jobe Fix, Seattle, WA (US); Nathan Seigo Matsuda, Redmond, WA (US); Nicholas Daniel Trail, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/456,388

(22) Filed: Mar. 10, 2017

(65) Prior Publication Data

US 2017/0262054 A1     Sep. 14, 2017

Related U.S. Application Data (60) Provisional application No. 62/307,308, filed on Mar. 11, 2016.

(51) Int. Cl.
    *G06F 3/01*          (2006.01)
    *G02B 27/00*      (2006.01)
    (Continued)

(52) U.S. Cl.
    CPC ......... *G06F 3/013* (2013.01); *G02B 27/0068* (2013.01); *G02B 27/0172* (2013.01);
    (Continued)

(58) Field of Classification Search
    CPC .......... G06F 3/013; G06F 3/012; G06F 3/011; G06F 1/163; G02B 27/0172;
    (Continued)

(56) References Cited

U.S. PATENT DOCUMENTS 5,768,443 A    6/1998   Michael et al.
5,801,885 A    9/1998   Togino
(Continued)

FOREIGN PATENT DOCUMENTS

JP     H0764013 A    3/1995
JP     3298081 B2     7/2002
(Continued)

OTHER PUBLICATIONS

European Extended Search Report, European Application No. 16161315.3, dated Aug. 2, 2016, 10 pages.

(Continued)

*Primary Examiner* — Patrick N Edouard
*Assistant Examiner* — Douglas M Wilson
(74) *Attorney, Agent, or Firm* — Fenwick & West LLP (57) ABSTRACT

A virtual reality (VR) headset adjusts the phase of light of a virtual scene received from a display element using a spatial light modulator (SLM) to accommodate changes in vergence for a user viewing objects in the virtual scene. The VR headset receives virtual scene data that includes depth information for components of the virtual scene and the SLM adjusts a wavefront of the light of the virtual scene by generating a phase function that adjusts the light of the virtual scene with phase delays based the depth values. Individual phase delays shift components of the virtual scene based on the depth values to a target focal plane to accommodate a user at a vergence depth for a frame of the virtual scene. Further, the SLM can provide optical defocus by shifting components of the virtual scene with the phase delays for depth of field blur.

17 Claims, 8 Drawing Sheets

(51) Int. Cl.
*G06T 19/00* (2011.01)
*G02B 27/01* (2006.01)

(52) U.S. Cl.
CPC ............ *G06F 3/012* (2013.01); *G06T 19/006* (2013.01); *G02B 2027/0129* (2013.01); *G02B 2027/0132* (2013.01); *G02B 2027/0185* (2013.01)

(58) Field of Classification Search
CPC ........ G02B 27/0068; G02B 2027/0185; G02B 2027/0129; G02B 2027/0132; G06T 19/006
See application file for complete search history.

(56) References Cited

U.S. PATENT DOCUMENTS

| | | | |
|---|---|---|---|
| 5,892,570 | A | 4/1999 | Stevens |
| 6,460,997 | B1 | 10/2002 | Frey et al. |
| 9,915,824 | B2 | 3/2018 | Schowengerdt et al. |
| 9,939,643 | B2 | 4/2018 | Schowengerdt |
| 10,445,860 | B2 | 10/2019 | Fix et al. |
| 2001/0017687 | A1 | 8/2001 | Rodriguez et al. |
| 2003/0182072 | A1 | 9/2003 | Satoh et al. |
| 2006/0210111 | A1 | 9/2006 | Cleveland et al. |
| 2007/0183293 | A1 | 8/2007 | Murata et al. |
| 2008/0062164 | A1 | 3/2008 | Bassi et al. |
| 2009/0189974 | A1 | 7/2009 | Deering |
| 2010/0079356 | A1 | 4/2010 | Hoellwarth |
| 2010/0118117 | A1* | 5/2010 | Kroll ................ G03H 1/02 348/40 |
| 2010/0141852 | A1 | 6/2010 | Jurik et al. |
| 2010/0177163 | A1 | 7/2010 | Yang et al. |
| 2010/0296148 | A1* | 11/2010 | Reichelt ............ G03H 1/02 359/228 |
| 2011/0075257 | A1 | 3/2011 | Hua et al. |
| 2012/0218172 | A1 | 8/2012 | Border et al. |
| 2012/0249797 | A1 | 10/2012 | Haddick et al. |
| 2013/0050070 | A1* | 2/2013 | Lewis .............. G06K 9/00604 345/156 |
| 2013/0176533 | A1 | 7/2013 | Raffle et al. |
| 2013/0314793 | A1 | 11/2013 | Robbins et al. |
| 2014/0085452 | A1 | 3/2014 | Nistico et al. |
| 2014/0092139 | A1 | 4/2014 | Sullivan et al. |
| 2014/0153102 | A1 | 6/2014 | Chang |
| 2014/0177063 | A1 | 6/2014 | Wang et al. |
| 2014/0211193 | A1 | 7/2014 | Bloom et al. |
| 2014/0368793 | A1 | 12/2014 | Friedman et al. |
| 2015/0035744 | A1 | 2/2015 | Robbins et al. |
| 2015/0062558 | A1 | 3/2015 | Koppal et al. |
| 2015/0102981 | A1 | 4/2015 | Lee et al. |
| 2015/0181096 | A1 | 6/2015 | Kasai et al. |
| 2015/0212326 | A1 | 7/2015 | Kress et al. |
| 2015/0222883 | A1 | 8/2015 | Welch |
| 2015/0237336 | A1 | 8/2015 | Sylvan et al. |
| 2015/0286070 | A1 | 10/2015 | Aikawa |
| 2015/0288944 | A1 | 10/2015 | Nistico et al. |
| 2015/0312560 | A1 | 10/2015 | Deering et al. |
| 2015/0346495 | A1* | 12/2015 | Welch ................ G06F 1/163 345/8 |
| 2016/0005179 | A1 | 1/2016 | Petyushko et al. |
| 2016/0091720 | A1 | 3/2016 | Stafford et al. |
| 2016/0103419 | A1 | 4/2016 | Callagy et al. |
| 2016/0219269 | A1* | 7/2016 | Tekolste ............ G02B 27/0172 |
| 2016/0240013 | A1 | 8/2016 | Spitzer |
| 2016/0295178 | A1* | 10/2016 | Damberg ............ H04N 9/3152 |
| 2016/0371886 | A1 | 12/2016 | Thompson et al. |
| 2017/0031435 | A1 | 2/2017 | Raffle et al. |
| 2017/0161951 | A1 | 6/2017 | Fix et al. |
| 2017/0213388 | A1* | 7/2017 | Margolis ................ G06F 3/013 |
| 2017/0299869 | A1* | 10/2017 | Urey ...................... G02B 27/48 |
| 2017/0343822 | A1 | 11/2017 | Border et al. |
| 2018/0114298 | A1 | 4/2018 | Malaika et al. |
| 2018/0133593 | A1* | 5/2018 | Wilson ................ G06T 15/06 |

FOREIGN PATENT DOCUMENTS

| | | |
|---|---|---|
| JP | 2014-219621 A | 11/2014 |
| KR | 10-2013-0011692 A | 1/2013 |
| KR | 10-2014-0144510 A | 12/2014 |
| WO | WO 2013/140697 | 3/2012 |
| WO | WO 2015/184412 A1 | 12/2015 |

OTHER PUBLICATIONS

Robinett, W., "Computational Model for the Stereoscopic Optics of a Head-Mounted Display," Proceedings of SPIE Stereoscopic Displays and Applications II, Jan. 1991, pp. 140-160, vol. 1457.
State, A. et al., "Dynamic Virtual Convergence for Video See-Through Head-Mounted Displays: Maintaining Maximum Stereo Overlap Throughout a Close-Range Work Space," IEEE and ACM International Symposium on New Augmented Reality, Oct. 29-30, 2001, pp. 137-146.
Machine translated JP2014-219521; Date of publication: Nov. 20, 2014.
PCT International Search Report and Written Opinion, PCT Application No. PCT/US2017/012346, dated Mar. 30, 2017, 13 pages.
PCT International Search Report and Written Opinion, PCT Application No. PCT/US2016/059938, dated Dec. 20, 2016, 12 pages.
PCT International Search Report and Written Opinion, PCT Application No. PCT/US2016/017397, dated Aug. 16, 2016, 21 pages.
U.S. Appl. No. 15/407,701, filed Jan. 17, 2017, Inventors Nicholas Daniel Trail et al. [Copy Not Enclosed].
U.S. Appl. No. 14/963,126, filed Dec. 8, 2015, Inventors Douglas Robert Lanman et al. [Copy Not Enclosed].
U.S. Appl. No. 15/366,412, filed Dec. 1, 2016, Inventor Nicholas Daniel Trail. [Copy Not Enclosed].
U.S. Appl. No. 14/963,109, filed Dec. 8, 2015, Inventors Douglas Robert Lanman et al. [Copy Not Enclosed].
Japan Patent Office, Office Action, Japanese Patent Application No. 2018-528282, dated Dec. 11, 2018, six pages.
United States Office Action, U.S. Appl. No. 16/525,358, dated Jul. 24, 2020, 45 pages.

* cited by examiner

(Frame n)
FIG. 11A (Frame n+1)
FIG. 11B

FOCUS ADJUSTING HEADSET

CROSS-REFERENCE TO RELATED APPLICATIONS

This application claims the benefit of U.S. Application No. 62/307,308, filed Mar. 11, 2016 which is incorporated by reference in its entirety.

BACKGROUND

The present disclosure generally relates to enhancing images from electronic displays, and specifically to varying the focal length of optics to enhance the images.

Virtual reality (VR) headset can be used to simulate virtual environments. For example, stereoscopic images can be displayed on an electronic display inside the headset to simulate the illusion of depth and head tracking sensors can be used to estimate what portion of the virtual environment is being viewed by the user. Such a simulation, however, can cause visual fatigue and nausea resulting from an inability of existing headsets to correctly render or otherwise compensate for vergence and accommodation conflicts.

SUMMARY

A virtual reality (VR) headset adjusts the phase of light of a virtual scene received from a three-dimensional (3D) electronic display element using a spatial light modulator (SLM) operating in a phase-modulation mode to accommodate changes in vergence for a user viewing objects displayed on the 3D electronic display. For example, the VR headset receives virtual scene data for the virtual scene that includes depth information or values for different components of the virtual scene. Before light of the virtual scene is received by an eye of the user, a spatial light modulator (SLM) adjusts a focal pattern or wavefront of the light for the portion of the virtual scene. The SLM generates a phase function based the depth values from the virtual scene data to adjust the wavefront by adding one or more phase delays to the light of the virtual scene. Individual phase delays shift components of the virtual scene based on the depth values to a target focal plane to accommodate a user at a vergence depth for a frame of the virtual scene. Further, the SLM can provide optical defocus by shifting components of the virtual scene via the phase delays to the wavefront for depth of field blur.

Different methods can be used to determine the vergence depth for a given frame of the virtual scene. For example, the vergence depth can be predetermined or set for a particular object in the virtual scene, assigned to a depth value corresponding to a central portion of a field of view of the VR headset as the headset moves with the user, or determined using an eye tracking system by identifying a location within the virtual scene corresponding to where the user is looking. The SLM can provide accommodation for the vergence depth or apply optical defocus as depth of field blur based on the vergence depth. Further, the application of optical defocus can be used in addition to other methods that seek to mitigate vergence-accommodation conflict, such as a varifocal system that provides accommodation for a given vergence depth by adjusting the focal length of an optics block, such as by mechanically moving one or more lenses, changing the shape of a lens, among others.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Vergence is the simultaneous movement or rotation of both eyes in opposite directions to obtain or maintain single binocular vision which is connected to accommodation of the eye. Under normal conditions, changing the focus of the eyes to look at an object at a different distance automatically causes vergence and accommodation. For example, as a real object moves closer to a user looking at the real object, the user's eyes rotate inward to stay verged on the object. As the object gets closer to the user, the eyes must "accommodate" for the closer distance by reducing the power or focal length, which is achieved automatically by each eye changing its shape. Thus, under normal conditions in the real world, the vergence depth corresponds to where the user is looking, which also equals the focal length of the user's eyes.

A conflict between vergence and accommodation, however, often occurs with some three-dimensional (3D) electronic displays. For example, as a virtual object is rendered on the 3D electronic display to move closer to a user looking at the object, each of the user's eyes rotates inward to stay verged on the object, but the power or focal length of each eye is not reduced; hence, the user's eyes do not accommodate as in the real-world. Instead of reducing power or focal length to accommodate for the closer vergence depth, the eyes maintain accommodation at a distance associated with 3D electronic display. Thus, the vergence depth often does not equal the focal length for the human eye for objects displayed on 3D electronic displays. This discrepancy between vergence depth and focal length is referred to as "vergence-accommodation conflict." A user experiencing only vergence or accommodation (and not both simultaneously) can experience some degree of fatigue or nausea, which is undesirable for virtual reality system creators.

Figure 1:
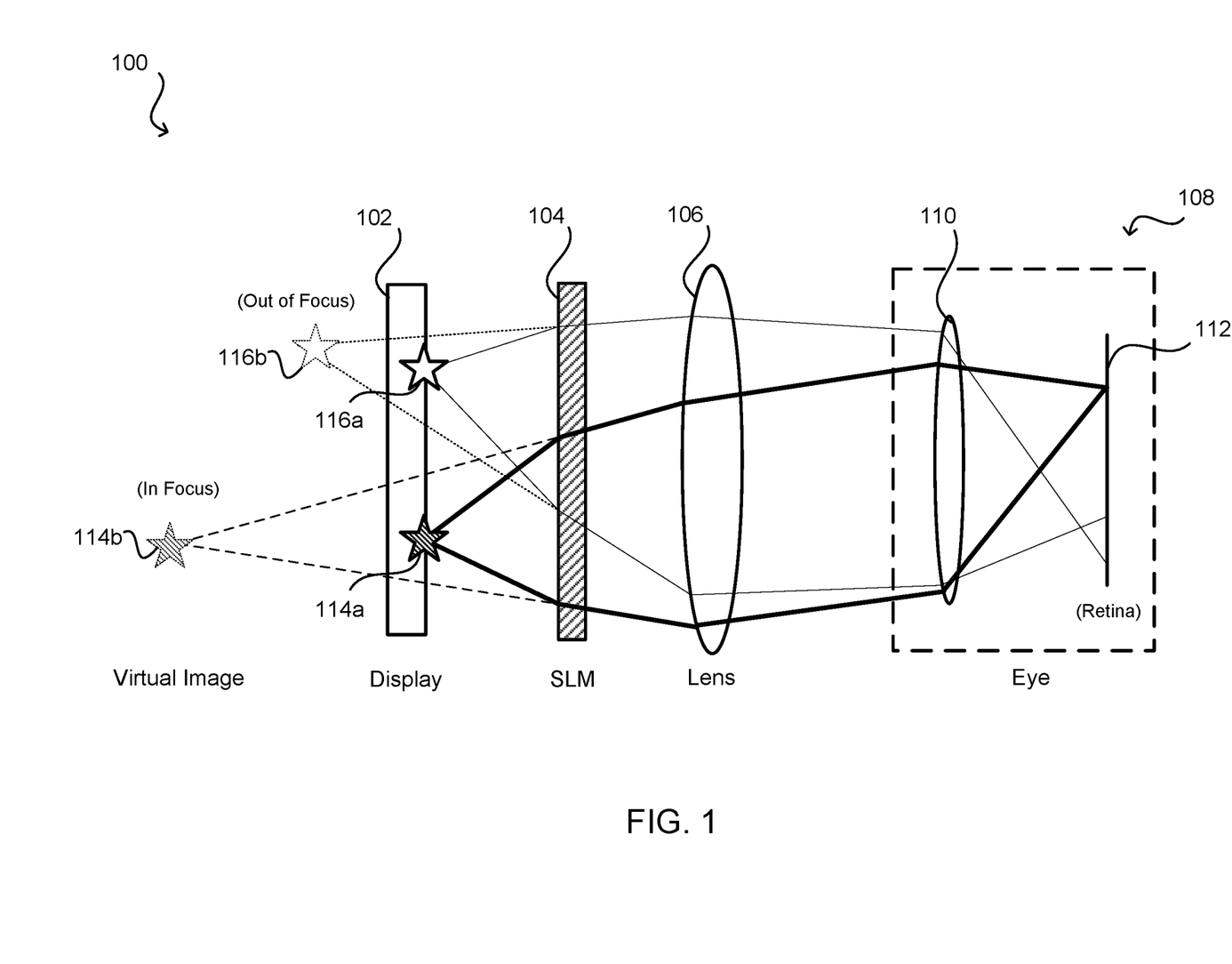
FIG. 1 shows example ray diagram for an optical system that can be incorporated into a VR headset, in accordance with at least one embodiment.

Accordingly, in one embodiment, a virtual reality (VR) headset dynamically adjusts the phase of light from a 3D electronic display element using a spatial light modulator (SLM) operating in a phase-modulation mode to accommodate changes in vergence of user viewing objects displayed on the 3D electronic display. For example, FIG. 1 shows example ray diagram 100 for an optical system that can be incorporated into a VR headset, in at least one embodiment. In this example, 3D electronic display element 102 displays a 3D virtual scene that includes virtual object 114a rendered as a virtual image 114b appearing a distance behind electronic display element 102 to a user. Light of the virtual scene, including virtual object 114a, is received by SLM 104 which generates a phase function, either analytically or from wavefront measurement, to shift the light of the virtual scene to a target focal plane for a given refresh interval (e.g., frame of the virtual scene, a change in position or orientation of the VR headset, etc.). The light of the virtual scene, shifted to the target focal plane, is received by objective lens 106 (used to provide a focal offset for the optical system, in this example) before the light reaches eye 108 of a user. Eye 108, which is simplified as lens 110 and imaging surface 112 corresponding to the user's retina, receives the light of the virtual scene including light for virtual image 114b of virtual object 114a and verges on virtual image 114b at the distance behind electronic display element 102. Thus, as the user views (i.e., is verged on) virtual object 114b, the phase function generated by SLM 104 adds one or more phase delays to the light (i.e., wavefront of the light) thereby shifting the virtual scene to the target focal plane to provide accommodation for eye 108 at the distance behind electronic display element 102 associated with virtual image 114b of virtual object 114a. The optical system of FIG. 1 may also be duplicated in a binocular setup.

Further, the phase function generated by SLM 104 can shift the virtual scene to a target focal plane that provides optical defocus to the virtual scene based on depth values associated with different objects or planes in the virtual scene and/or based on what object in the virtual scene eye 108 is verged on. Accordingly, in this example, ray diagram 100 further includes virtual object 116a rendered to also appear a distance behind electronic display element 102 as virtual image 116b. In this example, virtual image 116b is rendered to appear closer to electronic display element 102 relative to virtual image 114b. Since objects in the foreground appear out of focus to the eye in the real world when the eye is focused on an object in the background, the phase function generated by SLM 104 adds a phase delay to shift a portion of the wavefront associated with virtual image 116b that causes the light of the virtual scene to be out of focus to eye 108 as eye 108 is verged on virtual image 114b rendered at a farther distance relative to virtual image 116b. Accordingly, SLM 104 provides accommodation for different vergence depths of eye 108 and can also apply true optical defocus to objects or planes within the virtual scene associated with depth values other than the vergence depth for a particular frame of the virtual scene.

Different methods can be used to determine the vergence depth for a given frame of the virtual scene. In various embodiments, the vergence depth can be predetermined by the virtual scene, assigned to a depth value of the virtual scene corresponding to a central portion of a field of view of the VR headset, determined using eye tracking by identifying a location within the virtual scene corresponding to where a user is looking, among others. Further, the application of optical defocus can be used in addition to other methods that seek to mitigate vergence-accommodation conflict, such as a varifocal system that provides accommodation for a given vergence depth by adjusting the focal length of an optics block, such as by mechanically moving one or more lenses, changing the shape of a lens, among others.

System Overview

Figure 2:
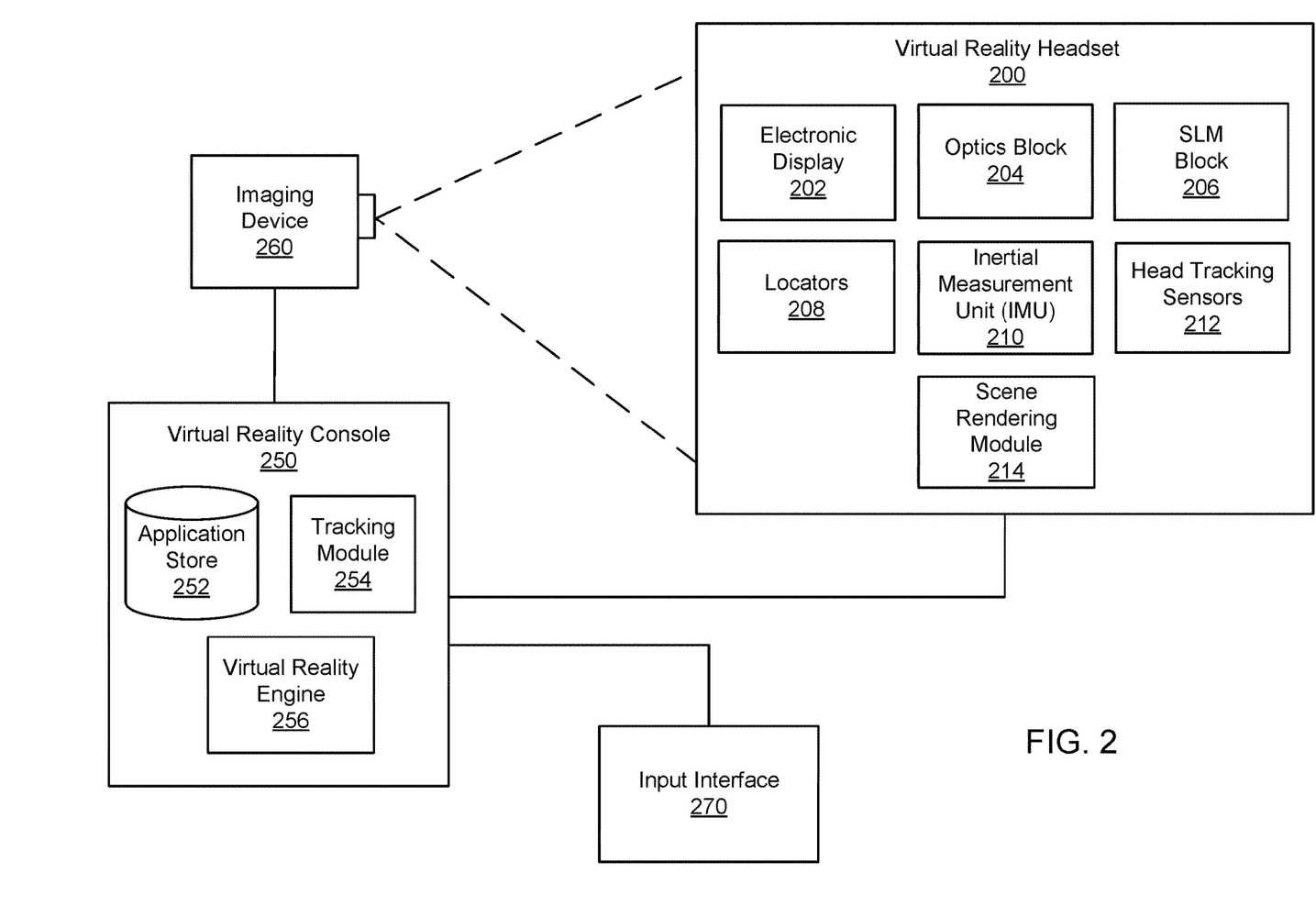
FIG. 2 shows an example virtual reality system, in accordance with at least one embodiment.

FIG. 2 is virtual reality (VR) system environment in which a VR console 250 operates. In this example, the VR system environment includes VR headset 200, imaging device 260, and VR input interface 270, which are each coupled to VR console 250. While FIG. 2 shows a single VR headset 200, a single imaging device 260, and a single VR input interface 270, in other embodiments, any number of these components may be included in the system. For example, there may be multiple VR headsets 202 each having an associated VR input interface 270 and being monitored by one or more imaging devices 260, with each VR headset 202, VR input interface 270, and imaging devices 260 communicating with the VR console 250. In alternative configurations, different and/or additional components may also be included in the VR system environment 200.

VR headset 200 is a Head-Mounted Display (HMD) that presents content to a user. Example content includes images, video, audio, or some combination thereof. Audio content may be presented via a separate device (e.g., speakers and/or headphones) external to VR headset 200 that receives audio information from VR headset 200, VR console 250, or both. VR headset 200 includes electronic display 202, optics block 204, spatial light modulator (SLM) block 206, one or more locators 208, internal measurement unit (IMU) 210, head tracking sensors 212, and scene rendering module 214.

Optics block 204 directs light from electronic display 202 via SLM block 206 to an exit pupil of VR headset 200 for viewing by a user using one or more optical elements, such as apertures, Fresnel lenses, convex lenses, concave lenses, filters, and so forth, and may include combinations of different optical elements. In some embodiments, one or more optical elements in optics block 204 may have one or more coatings, such as anti-reflective coatings. Magnification of the image light by optics block 204 allows electronic display 202 to be physically smaller, weigh less, and consume less power than larger displays. Additionally, magnification of the image light may increase a field of view of the displayed content. For example, the field of view of the displayed content is such that the displayed content is presented using almost all (e.g., 150 degrees diagonal), and in some cases all, of the user's field of view.

Spatial Light Modulator (SLM) block 206 includes one or more drivers to control electronic display 202 and an SLM to generate and display images of the virtual scene with dynamic spatiotemporal focal surfaces. SLM block 206, provided in optical series with optics block 204, operates in phase-only mode and generates a phase function for a given frame of the virtual scene. In various embodiments, SLM block 206 could be integrated into optics block 204. The phase function adds one or more phase delays to the light from electronic display 202 to shift the virtual scene to a target focal plane based on depth values associated with the virtual scene. In one embodiment, the target focal plane shifts the plane of focus to vary the focal length (or optical power) of VR headset 200 to keep a user's eyes in a zone of comfort as a target vergence and accommodation change for a particular frame of or location with the virtual scene. Further, the target focal plane can provide depth of field blur based on the depth values using a determined or set vergence depth as the plane of focus for a given frame of the virtual scene. Accordingly, the target focal plane may not be a simple planar surface, but may be a continuously-varying shape or a discontinuous surface that provides multiple focal lengths for the light of electronic display 202 for a single frame of the virtual scene based on the individual depth values of the virtual scene. Based on the depth value at each pixel in the rendered scene, the phase function can be generated to shift the display to the target focal plane at each pixel in a given frame of the virtual scene.

The position of SLM block 206 within the optical system of VR headset 200 is subject to design rules which limit certain performance parameters based on the respective configuration because of the limited resolution of the SLM. Thus, there are tradeoffs between configurations and their associated performance. For example, the focal range of VR headset 200 can be limited based on the location of SML block 206 relative to electronic display 202 and optics block 204. In this example, a larger focal range is achieved as the SLM is positioned closer to optics block 204 rather than display 202. Thus, as the SLM is positioned closer to display 202, the focal range is limited. Additionally, a larger field of view is also achievable as the SLM is positioned closer to optics block 204 rather than display 202 and, thus, as the SLM is positioned closer to display 202, the field of view is limited. However, as the SLM is positioned closer to optics block 204, edge boundary sharpness in the virtual scene is degraded. Thus, the closer the SLM is positioned to display 202, the sharper the edge boundaries. Accordingly, there are design tradeoffs and a balance to be sought between edge sharpness versus focal range and field of view.

Locators 208 are objects located in specific positions on VR headset 200 relative to one another and relative to a specific reference point on VR headset 200. Locator 208 may be a light emitting diode (LED), a corner cube reflector, a reflective marker, a type of light source that contrasts with an environment in which VR headset 200 operates, or some combination thereof. Active locators 208 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

Locators 208 can be located beneath an outer surface of VR headset 200, which is transparent to the wavelengths of light emitted or reflected by locators 208 or is thin enough not to substantially attenuate the wavelengths of light emitted or reflected by locators 208. Further, the outer surface or other portions of VR headset 200 can be opaque in the visible band of wavelengths of light. Thus, locators 208 may emit light in the IR band while under an outer surface of VR headset 200 that is transparent in the IR band but opaque in the visible band.

IMU 210 is an electronic device that generates fast calibration data based on measurement signals received from one or more of head tracking sensors 210, which generate one or more measurement signals in response to motion of VR headset 200. Examples of head tracking sensors 212 include accelerometers, gyroscopes, magnetometers, other sensors suitable for detecting motion, correcting error associated with IMU 210, or some combination thereof. Head tracking sensors 212 may be located external to IMU 210, internal to IMU 210, or some combination thereof.

Based on the measurement signals from head tracking sensors 212, IMU 210 generates fast calibration data indicating an estimated position of VR headset 200 relative to an initial position of VR headset 200. For example, head tracking sensors 212 include multiple accelerometers to measure translational motion (forward/back, up/down, left/right) and multiple gyroscopes to measure rotational motion (e.g., pitch, yaw, and roll). IMU 210 can, for example, rapidly sample the measurement signals and calculate the estimated position of VR headset 200 from the sampled data. For example, IMU 210 integrates measurement signals received from the accelerometers over time to estimate a velocity vector and integrates the velocity vector over time to determine an estimated position of a reference point on VR headset 200. The reference point is a point that may be used to describe the position of VR headset 200. While the reference point may generally be defined as a point in space, in various embodiments, reference point is defined as a point within VR headset 200 (e.g., a center of the IMU 210). Alternatively, IMU 210 provides the sampled measurement signals to VR console 250, which determines the fast calibration data.

IMU 210 can additionally receive one or more calibration parameters from VR console 250. As further discussed below, the one or more calibration parameters are used to maintain tracking of VR headset 200. Based on a received calibration parameter, IMU 210 may adjust one or more IMU parameters (e.g., sample rate). In some embodiments, certain calibration parameters cause IMU 210 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

Scene rendering module 214 receives content for the virtual scene from VR engine 256 and provides the content for display on electronic display 202. Additionally, scene rendering module 214 determines a portion of the content to be displayed on electronic display 202 based on one or more of tracking module 254, head tracking sensors 212, or IMU 210, as described further below.

Imaging device 260 generates slow calibration data in accordance with calibration parameters received from VR console 250. Slow calibration data includes one or more images showing observed positions of locators 208 that are detectable by imaging device 260. Imaging device 260 may include one or more cameras, one or more video cameras, other devices capable of capturing images including one or more locators 208, or some combination thereof. Additionally, imaging device 260 may include one or more filters (e.g., for increasing signal to noise ratio). Imaging device 260 is configured to detect light emitted or reflected from locators 208 in a field of view of imaging device 260. In embodiments where locators 208 include passive elements (e.g., a retroreflector), imaging device 260 may include a light source that illuminates some or all of locators 208, which retro-reflect the light towards the light source in imaging device 260. Slow calibration data is communicated from imaging device 260 to VR console 250, and imaging device 260 receives one or more calibration parameters from VR console 250 to adjust one or more imaging parameters (e.g., focal length, focus, frame rate, ISO, sensor temperature, shutter speed, aperture, etc.).

VR input interface 270 is a device that allows a user to send action requests to VR console 250. An action request is a request to perform a particular action. For example, an action request may be to start or end an application or to perform a particular action within the application. VR input interface 270 may include one or more input devices. Example input devices include a keyboard, a mouse, a game controller, or any other suitable device for receiving action requests and communicating the received action requests to VR console 250. An action request received by VR input interface 270 is communicated to VR console 250, which performs an action corresponding to the action request. In some embodiments, VR input interface 270 may provide haptic feedback to the user in accordance with instructions received from VR console 250. For example, haptic feedback is provided by the VR input interface 470 when an action request is received, or VR console 250 communicates instructions to VR input interface 270 causing VR input interface 270 to generate haptic feedback when VR console 250 performs an action.

VR console 250 provides content to VR headset 200 for presentation to the user in accordance with information received from imaging device 260, VR headset 200, or VR input interface 270. In the example shown in FIG. 2, VR console 250 includes application store 252, tracking module 254, and virtual reality (VR) engine 256. Some embodiments of VR console 250 have different or additional modules than those described in conjunction with FIG. 2. Similarly, the functions further described below may be distributed among components of VR console 250 in a different manner than is described here.

Application store 252 stores one or more applications for execution by VR console 250. An application is a group of instructions, that when executed by a processor, generates content for presentation to the user. Content generated by an application may be in response to inputs received from the user via movement of VR headset 200 or VR input interface 270. Examples of applications include gaming applications, conferencing applications, video playback application, or other suitable applications.

Tracking module 254 calibrates the VR system using one or more calibration parameters and may adjust one or more calibration parameters to reduce error in determining position of VR headset 200. For example, tracking module 254 adjusts the focus of imaging device 260 to obtain a more accurate position for observed locators 212 on VR headset 200. Moreover, calibration performed by tracking module 254 also accounts for information received from IMU 210. Additionally, if tracking of VR headset 200 is lost (e.g., imaging device 260 loses line of sight of at least a threshold number of locators 208), tracking module 254 re-calibrates some or all of the VR system components.

Additionally, tracking module 254 tracks the movement of VR headset 200 using slow calibration information from imaging device 260 and determines positions of a reference point on VR headset 200 using observed locators from the slow calibration information and a model of VR headset 200. Tracking module 254 also determines positions of the reference point on VR headset 200 using position information from the fast calibration information from IMU 210 on VR headset 200. Additionally, tracking module 254 may use portions of the fast calibration information, the slow calibration information, or some combination thereof, to predict a future location of VR headset 200, which is provided to VR engine 256.

VR engine 256 executes applications within the VR system and receives position information, acceleration information, velocity information, predicted future positions, or some combination thereof for VR headset 200 from tracking module 254. Based on the received information, VR engine 256 determines content to provide to VR headset 200 for presentation to the user, such as a virtual scene. For example, if the received information indicates that the user has looked to the left, VR engine 256 generates content for VR headset 200 that mirrors or tracks the user's movement in a virtual environment. Additionally, VR engine 256 performs an action within an application executing on VR console 250 in response to an action request received from the VR input interface 270 and provides feedback to the user that the action was performed. The provided feedback may be visual or audible feedback via VR headset 200 or haptic feedback via VR input interface 270.

Figure 3:
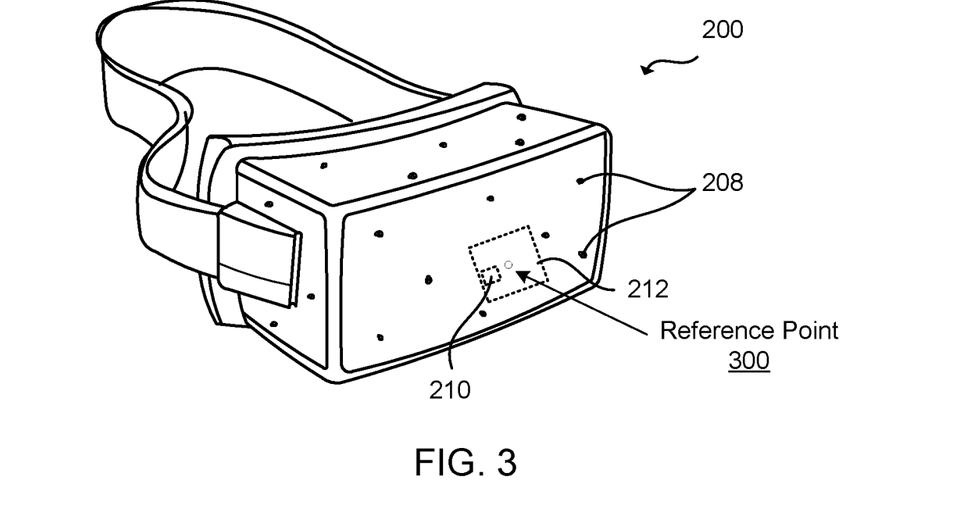
FIG. 3 shows a diagram of a virtual reality headset, in accordance with at least one embodiment.

FIG. 3 is a diagram of VR headset 200, in accordance with at least one embodiment. In this example, VR headset 200 includes a front rigid body and a band that goes around a user's head. The front rigid body includes one or more electronic display elements corresponding to electronic display 202, IMU 210, head tracking sensors 212, and locators 208. In this example, head tracking sensors 212 are located within IMU 210.

Locators 208 are located in fixed positions on the front rigid body relative to one another and relative to reference point 300. In this example, reference point 300 is located at the center of IMU 210. Each of locators 208 emits light that is detectable by imaging device 260. Locators 208, or portions of locators 208, are located on a front side, a top side, a bottom side, a right side, and a left side of the front rigid body, as shown FIG. 3.

Focus Adjustment Methods

Figure 4:
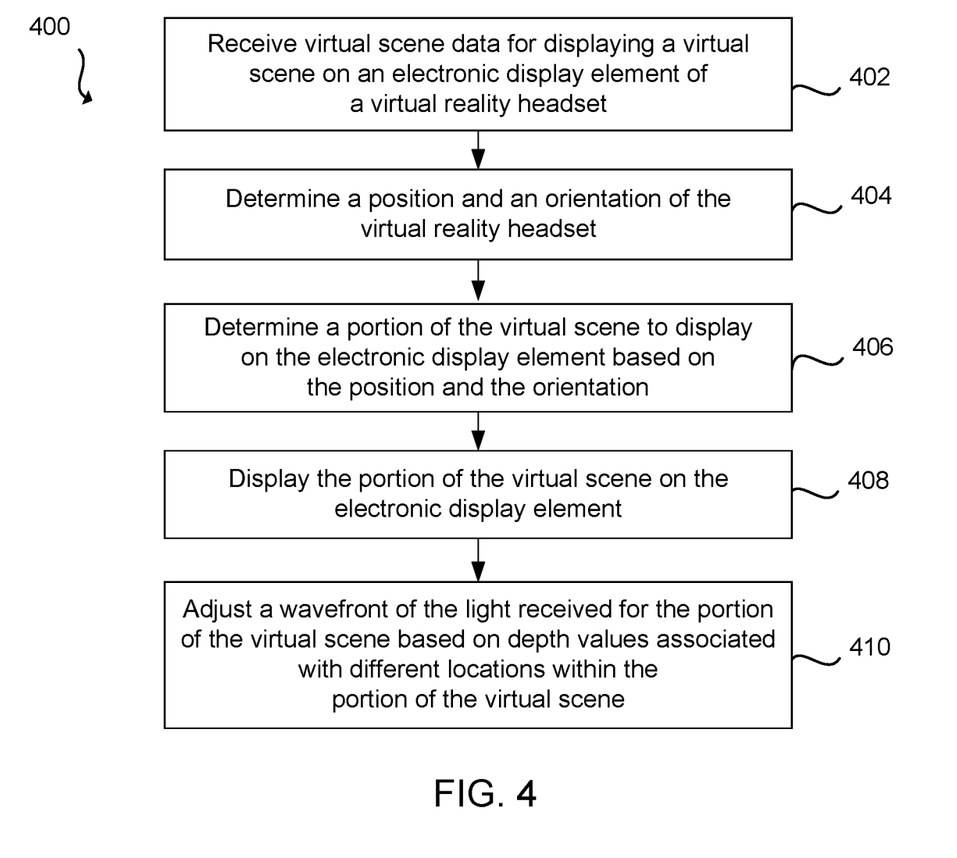
FIG. 4 shows an example process for mitigating vergence-accommodation conflict, in accordance with at least one embodiment.

FIG. 4 shows an example process 400 for mitigating vergence-accommodation conflict, in accordance with at least one embodiment. As discussed above, a VR headset can provide focus accommodation and depth of field blur using a SLM using depth values from virtual scene data that is also used by scene rendering module 214 to display the virtual scene using electronic display 202. Accordingly, in this example, virtual scene data for displaying a virtual scene is received 402. In one example, each pixel of electronic display is associated with an individual depth value, such as infinity for sky displayed in the virtual scene, one meter for an object on a table and varying distance between half a meter and one meter for the surface of the table, 3 meters for a far wall in the virtual scene, and so forth.

In this example, head tracking is used to determine which portion of the virtual scene to display to a user and the depth values for that portion are used to adjust the virtual scene for the user. Thus, a position and orientation of the VR headset is determined, as described above using a combination of locators 208, IMU 210, head tracking sensors 212, imaging device 260, and tracking module 254 of VR Console 250. From the determined position and orientation, the portion of the virtual scene to display on electronic display 202 is determined 406. Accordingly, the portion of the virtual scene is displayed 408 to the user via electronic display 202.

The light for the displayed portion of the virtual scene is received by a spatial light modulator (SLM) that, with depth value information for the portion of the virtual scene, generates a phase function to shift one or more components displayed in the portion of the virtual scene to a target focal plane determined using the depth values. The phase function adds one or more phase delays to the light of the displayed portion before the light reaches a user. The phase function can be generated based on the depth values relative to a predetermined vergence depth for the portion of the virtual scene. Accordingly, a focal pattern or wavefront of the light received for the portion of the virtual scene is adjusted 410 based on the phase function generated using the depth values.

For example, a location in the virtual scene associated with a character or other focal object could be preselected by the creators of the virtual scene as the user's focal point (i.e., is the location in the virtual scene where the creators want the user looking). Thus, the distance between the user and character or object in the virtual scene would be set as the plane of focus and the phase function generates the phase delays based on the plane of focus relative to the other depth values in the virtual scene. Further, the distance between the user and character may change depending on how close of far away the user moves relative to the character, thus, changing the depth value corresponding to the plane of focus for the user. Additionally, the phase function dynamically generated for each frame, or as the virtual distance between the user and character changes, can apply optical defocus based on the other depth values of the virtual scene relative to the plane of focus as depth of field blur.

Figure 5A:
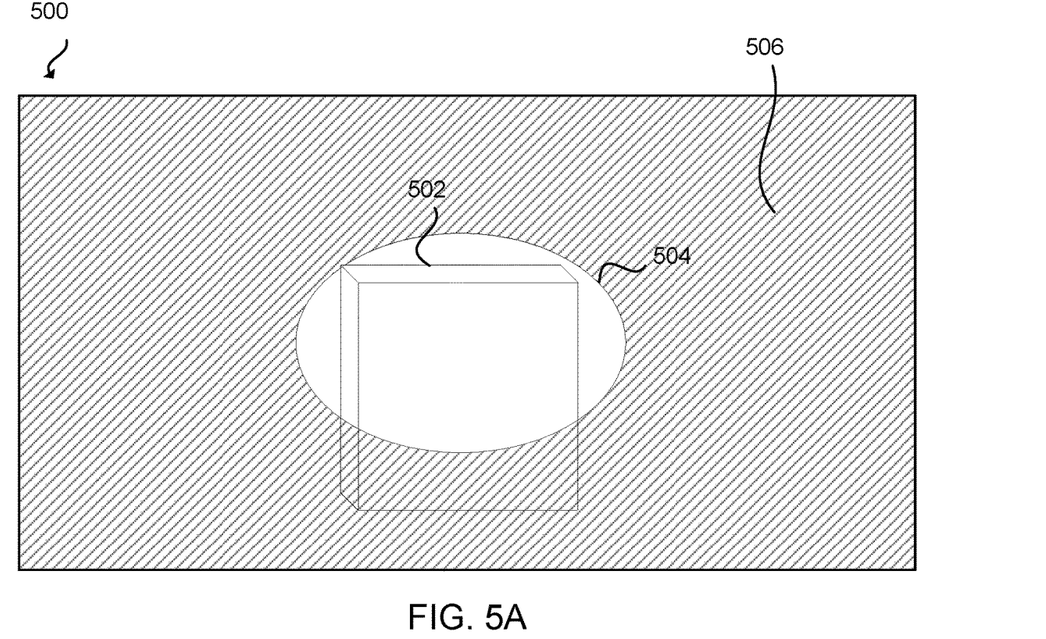
FIGS. 5A-5B show an example sequence where a central portion of a field of view of a virtual reality headset moves for being centered on an object to being centered on a background of an example virtual scene, in accordance with at least one embodiment.
Figure 5B:
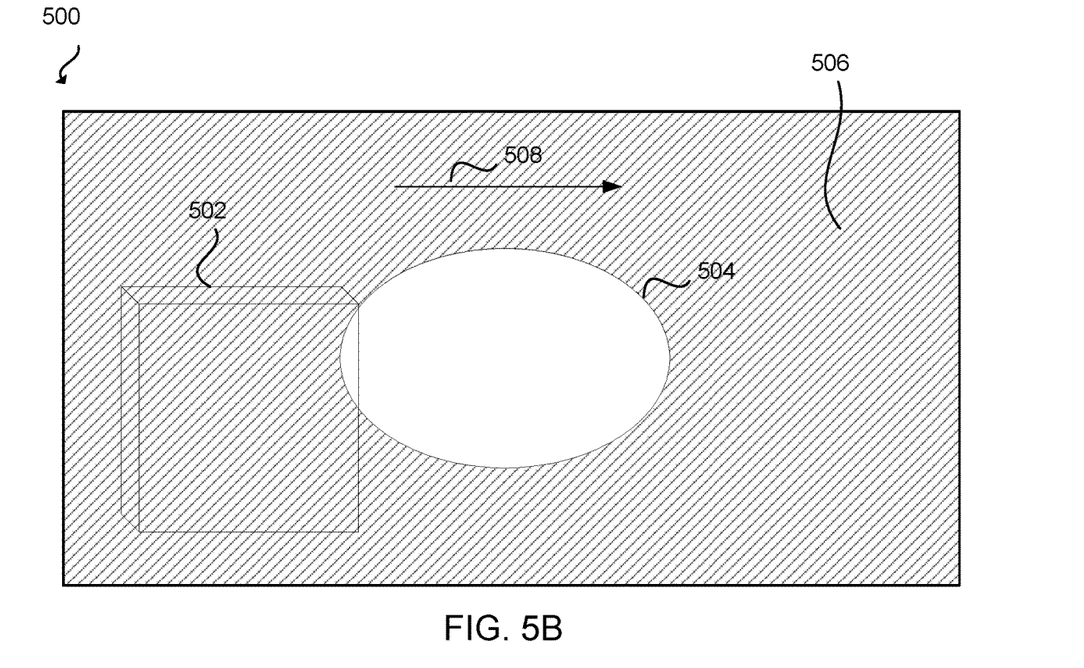

Alternatively, a central portion of a field of view of the VR headset can be set or assigned as a user's default viewing location. FIGS. 5A-5B show an example sequence where central portion 504 of field of view 500 of a virtual reality headset moves for being centered on object 502 to being centered on background 506 of an example virtual scene, according to one embodiment. In this example, a central portion 504 corresponding to a user's natural or default gaze location in the middle of field of view 500 assumed to be where the user is looking (i.e., the user is not looking out of the corner of their eyes at object displayed at relatively extreme gaze angles). Accordingly, a depth value associated with a majority of pixels in central portion 504 corresponding to the default viewing location can be selected as the plane of focus for a given frame. In this example, FIG. 5A corresponds to the first frame of the virtual scene in this sequence and the majority of pixels in central portion 504 for this frame are associated with depth values for object 502. Thus, for the frame of FIG. 5A, the plane of focus can be set as the depth value of object 502 and the phase function generated by the SLM can adjust the focal pattern or wavefront to provide depth of field blur using real optical defocus based on the other depth values relative to object 502 in this frame. Accordingly, FIG. 5B shows object 502 no longer in central portion 504. Instead, object 502 is to the left of central portion 504 corresponding to the user moving 508 their head to view an object to the right or to focus on background 506 of the virtual scene. Thus, in this example, the majority of pixels in central portion 504 are associated with a depth value for background 506 for this second frame of the virtual scene. In response, the SLM dynamically updates the focal pattern or wavefront of the virtual scene by generating an updated phase function based on the background as the plane of focus and adjust the depth of filed blur accordingly.

In various embodiments, content-adaptive wavelength compensation can be utilized where the phase or focal patterns generated using the SLM may dependent on the wavelength of light passing through the optical system of VR headset 200. For a color display, the color at each scene point (i.e., pixel) can be taken into account when generating the focal patterns. For color with multiple wavelengths, the patterns for theses scene point can be interleaved or sequentially displayed. A color filter array may also be placed on the SLM to mitigate wavelength-dependent artifacts. Color artifacts may also be mitigated with time-multiplexing of the color channels (i.e., the phase-only SLM will be optimized for a single illumination wavelength from the rear display at each subframe).

Figure 6:
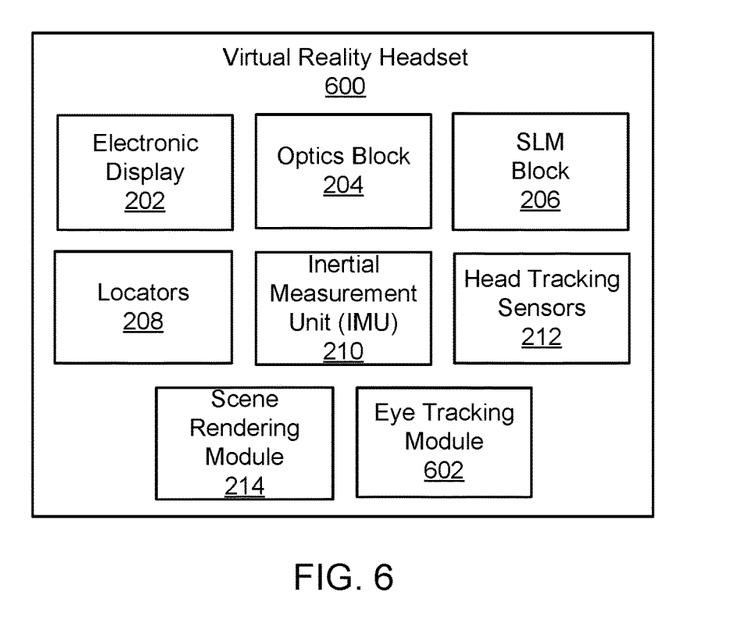
FIG. 6 shows another diagram of a virtual reality headset that includes an eye tracking system, in accordance with at least one embodiment.

FIG. 6 shows diagram of virtual reality headset 600 that includes eye tracking module 602, in accordance with at least one embodiment. In this example, VR headset 600 is similar to a VR headset 200 including an eye tracking module 602. Accordingly, in this embodiment, the vergence depth is determined based on where in the virtual scene a user is looking as determined by an eye tracking system controlled by the eye tracking module 602. Eye tracking module 602 tracks an eye position and eye movement of a user of VR headset 600. The eye tracking systems includes an image capturing element, such as a camera or other optical sensor, inside VR headset 600 that captures image information of a user's eyes. The eye tracking module 602 uses the captured information to determine interpupillary distance, interocular distance, a three-dimensional (3D) position of each eye relative to VR headset 600 (e.g., for distortion adjustment purposes), including a magnitude of torsion and rotation (i.e., roll, pitch, and yaw) and gaze directions for each eye. In some embodiments, the eye tracking system also includes one or more light sources. In one example, infrared light is emitted by the one or more light source (e.g., one or more infrared light emitting diodes) of the eye tacking system within VR headset 600 and reflected from each eye. The reflected light is received or detected by the camera and analyzed to extract eye rotation from changes in the infrared light reflected by each eye. Many methods for tracking the eyes of a user can be used by eye tracking module 602. Accordingly, eye tracking module 602 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, eye tracking module 602 integrates information from past measurements, measurements identifying a position of a user's head, and 3D information describing a scene presented by electronic display element 202. Thus, information for the position and orientation of the user's eyes is used to determine the gaze or vergence point in the virtual scene presented by VR headset 600 corresponding to where the user is looking.

Accordingly, the vergence depth of a user's gaze based on the gaze point or an estimated intersection of the gaze lines determined by eye tracking module 602. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the gaze lines can be triangulated to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused and a depth from the user's eyes at which the eyes are focused, thereby, providing information, such as an object or plane of focus, for rendering adjustments to the virtual scene.

Figure 7:
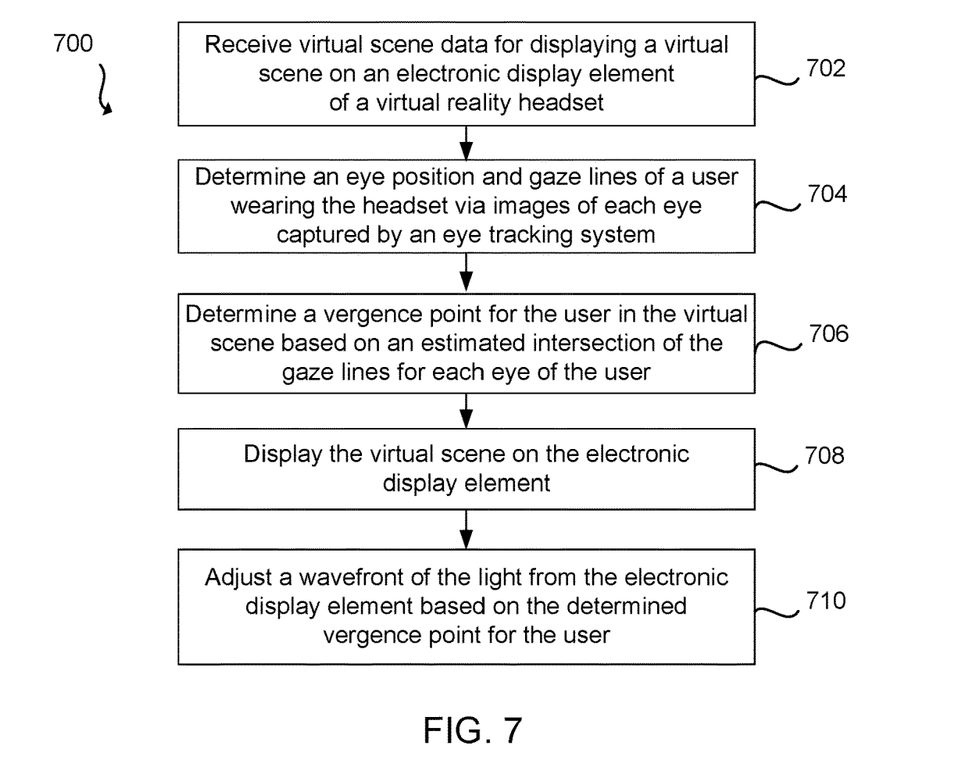
FIG. 7 shows an example process for mitigating vergence-accommodation conflict that utilizes an eye tracking system, in accordance with at least one embodiment.

FIG. 7 shows an example process 700 for mitigating vergence-accommodation conflict that utilizes an eye tracking system, in accordance with at least one embodiment. Accordingly, in this example, virtual scene data for displaying a virtual scene is received 702. In one example, each pixel of electronic display is associated with an individual depth value, such as infinity for sky displayed in the virtual scene, one meter for an object on a table and varying distance between half a meter and one meter for the surface of the table, 3 meters for a far wall in the virtual scene, and so forth.

Figure 8:
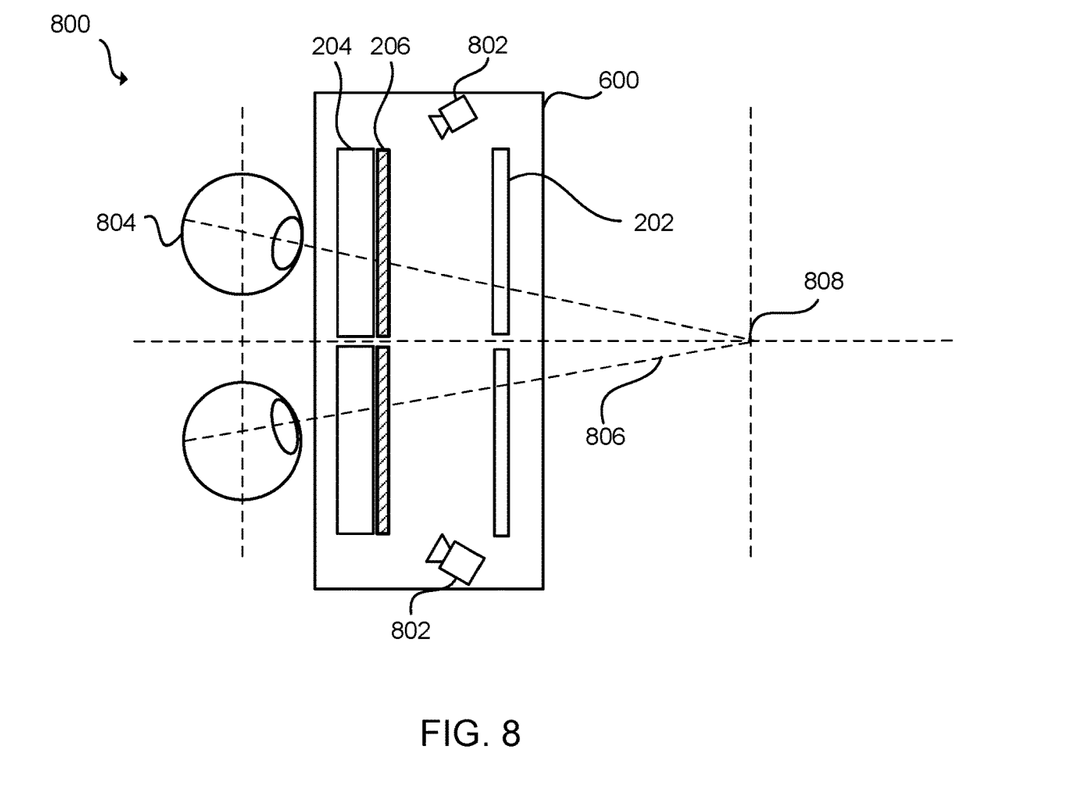
FIG. 8 shows a cross section of a virtual reality headset including an image capturing element for tracking eye position, in accordance with at least one embodiment.

In this example, eye tracking is used to determine a location within the virtual scene corresponding to where the user is looking. Accordingly, an eye position and gaze lines of the user wearing VR headset 600 are determined 704 via images captured by eye tracking module 602. FIG. 8 shows cross section 800 of an embodiment of VR headset 600 that includes camera(s) 802 for tracking the position of each eye 804. In this example, camera 802 captures images of the user's eyes and eye tracking module 602 determines an output for each eye 804 and gaze lines 806 corresponding to the gaze point or location where the user is looking based on the captured images.

Referring to FIGS. 7 and 8, vergence point 808 for the user is determined 706 based on an estimated intersection of gaze lines 806. As shown in FIG. 8, gaze lines 806 converge or intersect at 808, where vergence point 808 is located. Because virtual distances within the virtual scene are known to the VR system, the vergence depth for vergence point 808 can be determined using the virtual scene data for the virtual scene. Accordingly, the virtual scene is displayed 708 to the user via electronic display 202.

The light for the displayed portion of the virtual scene is received by the SLM of SLM block 206 that, with depth value information for the virtual scene, generates a phase function to shift the one or more components displayed in the virtual scene to the target focal plane determined using a depth values for the vergence point as the plane of focus. The phase function is additionally generated based on the depth values relative to the depth value of the vergence point for the virtual scene. Accordingly, a wavefront of the light received for the portion of the virtual scene is adjusted 710 based on the phase function generated using the vergence point and the depth values associated with the virtual scene.

Figure 9:
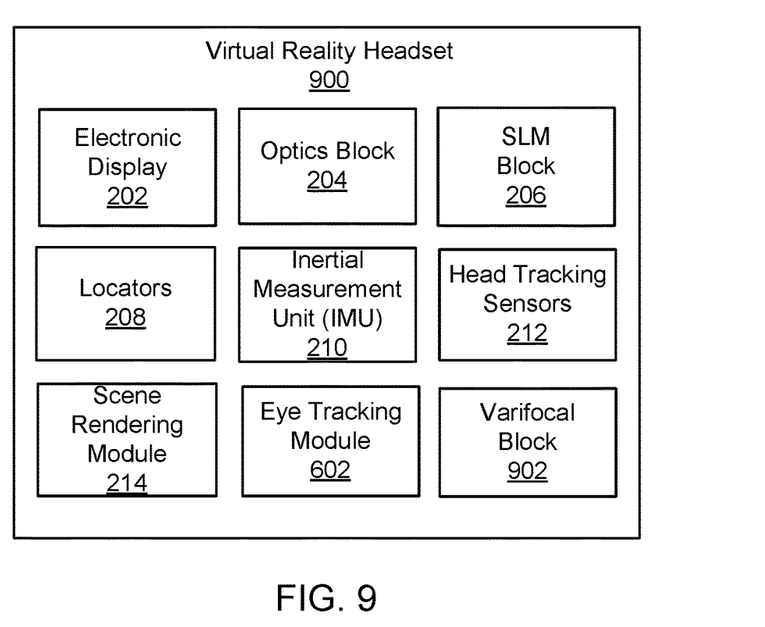
FIG. 9 shows another diagram of a virtual reality headset that includes a varifocal element, in accordance with at least one embodiment.

FIG. 9 shows diagram of virtual reality headset 900 that includes a varifocal block 902, in accordance with at least one embodiment. In this example, VR headset 900 is similar to VR headset 600 while additionally including varifocal block 902. Varifocal actuation block 902 includes a varifocal element that causes optics block 204 to vary the focal length (or optical power) of VR headset 900 keep a user's eyes in a zone of comfort as vergence and accommodation change. In one embodiment, varifocal actuation block 902 physically changes the distance between electronic display 202 and optical block 204 by moving electronic display 202 or optical block 204 (or both) to adjust the focal length of optics block based on a vergence point and SLM block 206 applies optical defocus to the virtual scene based on the vergence point and other depth values for the virtual scene.

Alternatively, varifocal actuation block 902 changes the focal length of optics block 104 by adjusting one or more properties of one or more lenses. Example properties of a lens adjusted by the varifocal actuation block 902 include: an optical path length, an index of refraction of a lens medium, a shape of a lens, and so forth. For example, varifocal actuation block 902 changes the focal length of the one or more lenses using shape-changing polymer lenses, electrowetting methods with liquid lenses, Alvarez-Lohmann lenses, deformable membrane mirrors, liquid crystal (electroactive) lenses, or a phase-only SLM, or any other suitable component. Additionally, moving or translating two lenses relative to each other may also be used to change the focal length of VR headset 900. Thus, varifocal actuation block 902 may include actuators or motors that move electronic display 202 and/or optical block 204 on a track to change the distance between them or may include actuators and other components or mechanisms for changing the properties of one or more lenses included in optics block 204. Varifocal actuation block 902 may be separate from or integrated into optics block 204 in various embodiments.

Figure 10:
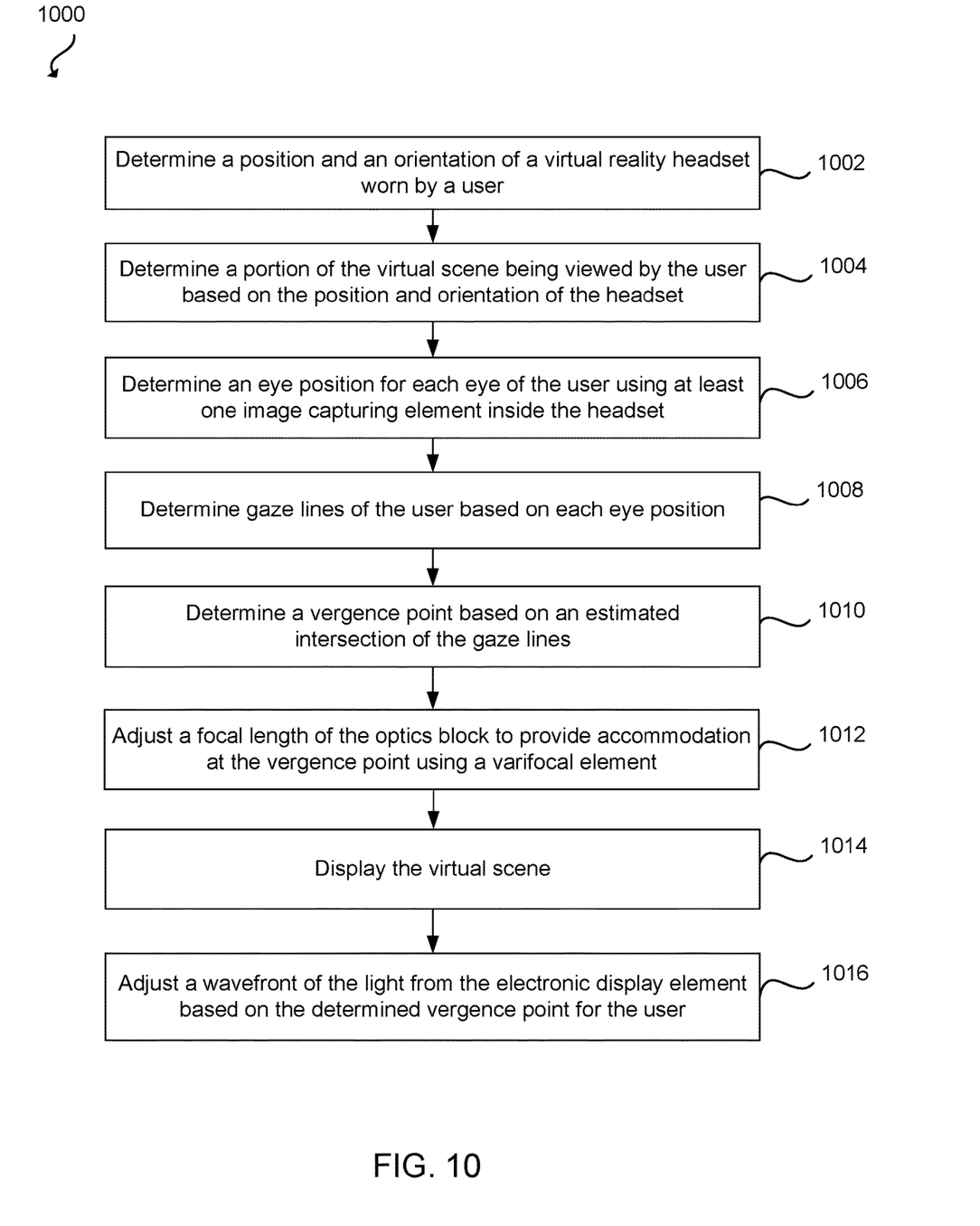
FIG. 10 shows another example process for mitigating vergence-accommodation conflict that utilizes a varifocal element, in accordance with at least one embodiment.

FIG. 10 shows an embodiment of a process 1000 for mitigating vergence-accommodation conflict by adjusting the focal length of optics block 204 of virtual reality (VR) headset 900 while applying optical defocus for depth of field blur using SLM block 206. As discussed above, a varifocal system may dynamically vary its focus to bring images presented to a user wearing VR headset 900 into focus, which keeps the user's eyes in a zone of comfort as vergence and accommodation change. Additionally, eye tracking in combination with the variable focus of the varifocal system and SLM block 206 allows blurring to be introduced as depth cues in images presented by VR headset 900.

Accordingly, in the embodiment shown by FIG. 10, a position, an orientation, and/or a movement of VR headset 900 are determined 1002 by a combination of locators 208, IMU 210, head tracking sensors 212, imagining device 260, and tracking module 254, as described above in conjunction with FIG. 2. Portions of a virtual scene presented by VR headset 900 are mapped to various positions and orientations of VR headset 900. Thus, a portion of the virtual scene currently viewed by a user is determined 1004 based on the position, orientation, and movement of VR headset 900. After determining 1004 the portion of the virtual scene being viewed by the user, the VR system may then determine a location or an object within the determined portion at which the user is looking to adjust focus for that location or object accordingly.

To determine the location or object within the determined portion of the virtual scene at which the user is looking, VR headset 900 tracks the position and location of the user's eyes. Thus, VR headset 900 determines 1006 an eye position for each eye of the user. For example, VR headset 900 tracks at least a subset of the 3D position, roll, pitch, and yaw of each eye and uses these quantities to estimate a vergence point, such as a 3D gaze point for the user's eyes. Further, information from past eye positions, information describing a position of the user's head, and information describing a scene presented to the user may also be used to estimate the 3D gaze point of an eye in various embodiments. Referring to FIG. 8, a cross section of an embodiment similar to VR headset 900 is shown that includes camera 802 for tracking the position of each eye 804. In this example, camera 802 captures images of the user's eyes and an output for each eye 804 is determined 1006 by eye tracking module 602 based on the captured images.

Accordingly, gaze lines 806 corresponding to the gaze point or location where the user is looking in the virtual scene are determined 1008 based on the determined eye positions and a vergence point for the user is determined 1010 based on an estimated intersection of the gaze lines.

Figure 11A:
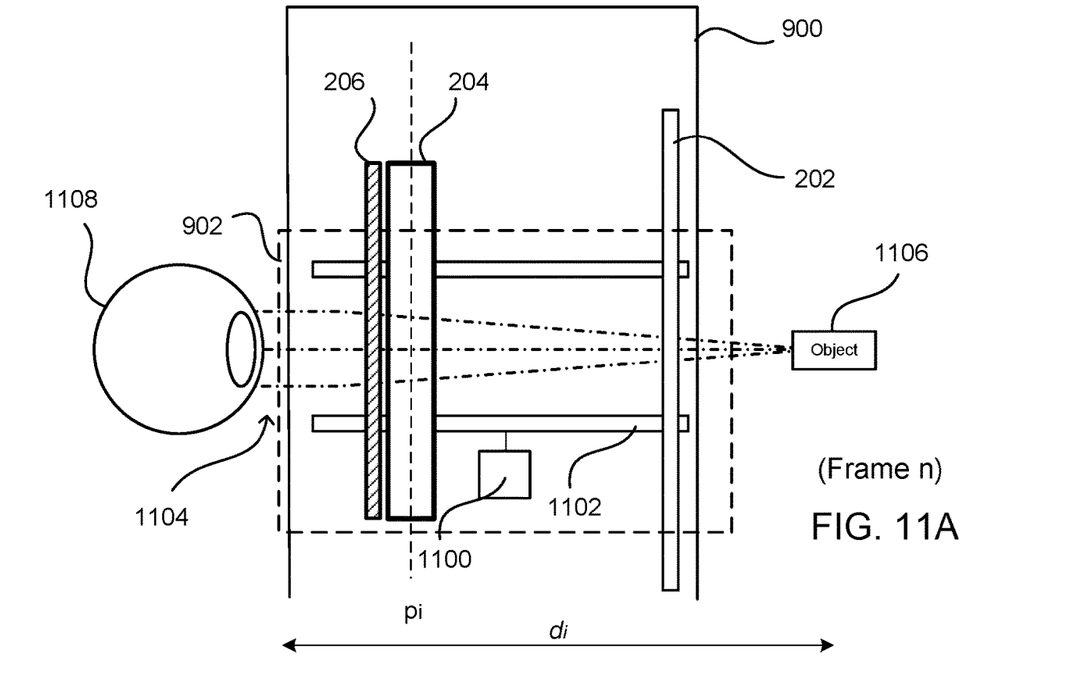
FIGS. 11A and 11B show an example process for adjusting the focal length of an optics block of a virtual reality headset by varying the distance between a display screen and the optics block using a varifocal element, in accordance with at least one embodiment.
Figure 11B:
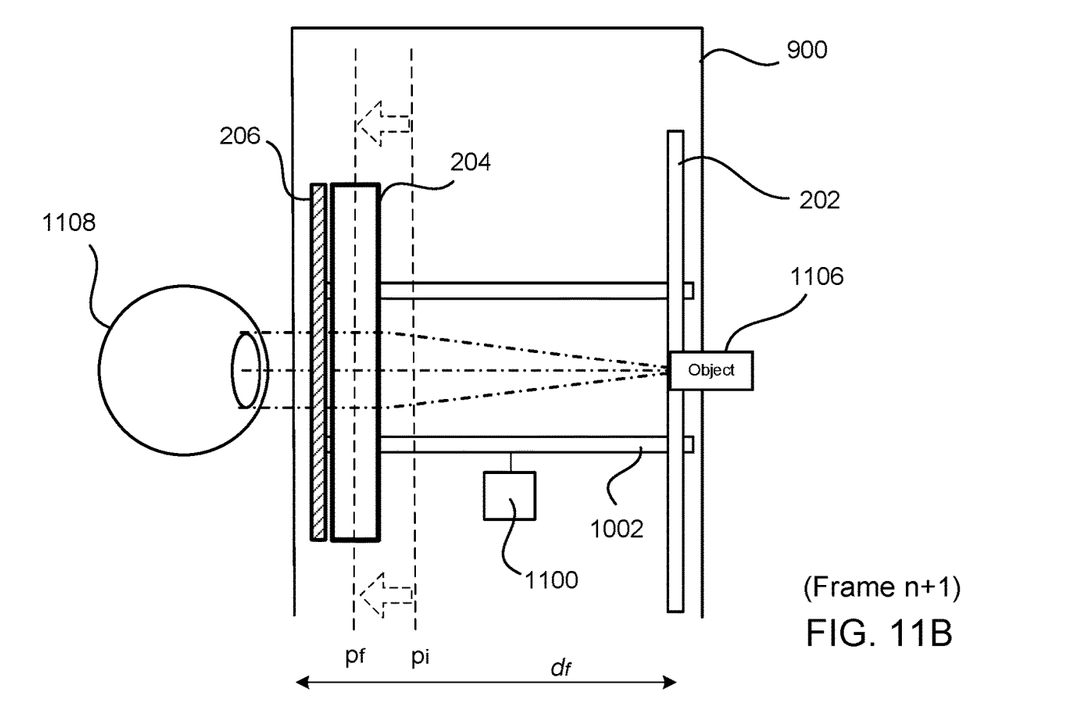

Accordingly, referring again to FIG. 10, the focal length (or power) of optics block 204 is adjusted 1012 for the presented frame of the virtual scene to provide accommodation for the generated filtered vergence depth. FIGS. 11A and 11B show an example process for adjusting the focal length of optics block 204 by varying the distance between electronic display 202 and optics block 204 using varifocal element 1100. In the example of FIGS. 11A and 11B, varifocal actuation block 902 includes varifocal element 1100, such as an actuator or motor and track 1102, but may also include other components enabling optics block 204 and SLM 206, electronic display 202, or both to move along track 1102 to dynamically adjust the optical power of optics block 204.

FIG. 11A shows an example of VR headset 900 providing focus adjustment for frame n of a virtual scene. In this example, virtual scene includes object 1106 displayed on electronic display 202 at which the gaze of user 1108 is directed (i.e., verged). A virtual image of object 1106 is located a virtual distance $d_i$, behind electronic display 202, from exit pupil 1104. In the example of FIG. 11A, optics block 204 is in position $p_i$, which provides accommodation for distance $d_i$ to enable comfortable viewing of object 1106.

FIG. 11B shows VR headset 900 providing focus adjustment for a subsequent frame n+1 of the virtual scene. In this example, user 1108 may have repositioned its eyes to look at object 1106 or object 1106 quickly moved toward user 1108 in the virtual scene. As a result, the virtual image of object 1106 is located close to electronic display 202. In response to the location of object 1106 close to the electronic display 202, which is closer than object 1106 in FIG. 11A), eyes of user 1108 rotate inward to verge on object 1106, causing a new vergence depth for frame n+1 to be determined and to provide the new vergence depth to varifocal block 902. Based on the new vergence depth, varifocal element 1100 moves optics block 204 and SLM block 206 (provided between eye of user 1108 and optics block 204 in this embodiment) from position $p_i$ to new position $p_f$ to accommodate user 1108 at the new vergence depth $d_f$ for the closer object 1106. Though FIGS. 11A and 11B show varifocal block 902 as an element that changes the distance between electronic display 202 and optics block 204, it should be understood that varifocal actuation block 902 could alternatively include one or more components to change the shape or other property affecting the focal length of one or more lenses of optics block 204. Example components for changing the shape of one or more lenses or other property affecting the focal length include: shape-changing polymer lenses, liquid lenses with electrowetting, Alvarez-Lohmann lenses, deformable membrane mirrors, liquid crystal (electroactive) lenses, phase-only spatial light modulator (SLM), and other suitable components.

In many instances, virtual reality systems aim to present users with a virtual environment that closely simulates a real world environment or provides users with content causing the users to get lost in the illusion created by the virtual reality systems. To provide users with a realistic or captivating virtual environment, a virtual reality system implements multiple systems and methods discussed herein to operate together at efficiencies that are imperceptible to a user. For example, transition delays are particularly costly to user experience with virtual reality systems. If a user is waiting for the virtual scene presented by a VR headset to catch up to what the user's brain is already expecting, the illusion is broken and/or the user may get nauseous. However, processing speeds and commercially available actuators are currently faster than the coordination of the human eye to change the shape of its lens and the human brain to register what the new shape of the lens is focused on, allowing the disclosed systems and methods to provide users with high-quality virtual environments.

Returning to FIG. 10, the virtual scene is displayed 1014 and the light for the displayed portion of the virtual scene is received by a spatial light modulator (SLM) that, with depth value information for the portion of the virtual scene, generates a phase function to shift one or more components or locations displayed in the portion of the virtual scene to a target focal plane determined using depth values provided with virtual scene data for the virtual scene. The phase function adds one or more phase delays to the light of the displayed portion before the light reaches a user. The phase function is generated based on the a depth value for the determined vergence point while additionally using the other depth values of the virtual scene relative to the depth value for the determined vergence point for the portion of the virtual scene to provide depth of field blur by shifting displayed portions, locations, or components of the virtual scene associated with depth values other than the depth value for the determined vergence point using true optical defocus. Accordingly, the wavefront of the light received for the portion of the virtual scene is adjusted 1016 based on the phase function generated using the depth value for the determined vergence point and the depth values for other locations or components in the virtual scene.

In one example, the depth value within the scene geometry (e.g., distances within the virtual scene) corresponding to the depth value for the determined vergence point is determined as the plane of focus for the frame of the virtual scene. Accordingly, objects or features of the virtual environment with distances within the virtual scene greater or less than a distance of the plane of focus from the user's eyes may be provided with a phase delay to appear out of focus. In another example, the depth of field blur is determined based on an object in the scene on which the user's gaze is focused at the depth corresponding to the determined vergence point (i.e., a "focal object"). Thus, the focal object, rather than the plane of focus, provides a reference point to identify other objects in the scene to apply the optical defocus, even if the other objects have a similar depth in the scene as the focal object.

The blur (i.e., optical defocus) may be progressive, with as a level of blur applied to objects or features based on a distance of the objects or features from the plane of focus (or object of focus), or a generally uniform level of blur may be applied to objects or features in the virtual scene. Depth of field blur is a natural consequence of binocular vision, so including depth of field blur in the virtual scene furthers to the illusion of the virtual scene by providing the user with an expected depth cue, which may enhance the user experience with the virtual scene. Further, the blur may be based at least in part on measured properties of the user's eye. For example, wavefront aberrations of the user's eye could be measured by a wavefront aberrometer, with optical defocus being applied by SLM block 206 based at least in part on the measured wavefront aberrations. Example wavefront aberrations of the user's eye may include higher-order aberrations not typically corrected by eye glasses, contact lenses, or refractive surgery. Accounting for properties of the user's eye when determining the depth of field blur may improve user comfort when viewing the scene.

Accordingly, a VR headset (e.g., 200, 600, 900) may include of a display (LCD, OLED, laser projector, etc.) in optical series with one or more spatial light modulators. The spatial light modulators operate in phase-modulation mode and may be transmissive or reflective. The VR headset may further contain intermediary optics, such as beam splitters and relay lenses, to place the display and SLM at the desired locations in the optical path. Further, VR headset may dynamically reallocate display resolution into image areas with high local contrast to produce a retinal image with higher apparent resolution. In conjunction with gaze tracking, VR headset may be used to demagnify the display where the user is looking, effectively reallocating display pixels towards areas of the retina with higher visual acuity. This can be used in conjunction with any of the other methods to provide both higher visual accuity and correct focal cues.

Thus, for a given focal plane (chosen based on gaze-tracking, for example), a phase function corresponding to a single lens surface (generated analytically or from wavefront measurements) to shift the display to the target focal plane can be assigned to the SLM at each refresh interval. The target focal plane may not be a simple planar surface, but may be a continuously-varying shape or a discontinuous surface in the modes discussed above. The global varifocal mode may be operated depending on eye gaze or independently. For example a fixed "focal sweep" pattern may be repeated periodically, independently of eye tracking.

In various embodiments, the target focal plane may not be a simple planar surface, but may be a continuously-varying shape or a discontinuous surface based on the individual depth values of the virtual scene. Based on the depth value at each pixel in the rendered scene, the phase function can be generated to shift the display to the target focal plane at each pixel in a given frame of the virtual scene. This method may be combined with an OLED image generation method to produce a display pattern that, when displayed and imaged onto the retina, has the effect of deconvolving undesired blur artifacts stemming from depth discontinuities in the scene.

Further, the SLM focal pattern can be generated to include lateral shifts to separate image areas on the display that would otherwise produce blur artifacts at depth discontinuities. The display image is segmented and shifted accordingly to produce the desired retinal image. The SLM and display control can be formulated as a joint optimization problem, where the desired lightfield, wavefront, or retinal image is targetted in the objective. Additionally temporal modulation can be implemented using multiple phase-only SLM and rear display patterns may be presented at high speed, so that their integrate by the eye produces an image that cannot be replicated by a single phase-only SLM pattern and a single rear-display pattern. This enables temporal modulation to increase the fidelity of the recreated focal surface.

The methods described above are not limited to virtual reality (non-see-through) implementations and may additionally be extended to augmented reality (see-through) headset implementations. The algorithms will be at least similar, but the optical hardware may be modified to allow an optical or electrical see-through path (e.g., using beam splitters, optical relays, and external cameras).

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A method comprising:
   receiving, by a virtual reality headset, virtual scene data to display a virtual scene on an electronic display element of the virtual reality headset, the virtual scene data including a depth value assigned to each pixel of the electronic display element;
   determining an eye position and gaze lines for each eye of a user wearing the virtual reality headset via images of each eye captured by an eye tracking system included in the virtual reality headset;
   determining a vergence point for the user in the virtual scene based on an estimated intersection of the gaze lines for each eye of the user;
   displaying the virtual scene on the electronic display element, the virtual reality headset including an optics block and a transmissive spatial light modulator (SLM) operating in a phase-modulation mode in optical series that receive a wavefront of light of the virtual scene displayed on the electronic display element; and
   adjusting, via the SLM, the wavefront of the light from the electronic display element displaying the virtual scene by introducing individual phase delays that adjust the wavefront received from the electronic display element based on depth values assigned to individual pixels of the electronic display element, wherein the individual phase delays that adjust the wavefront cause the SLM to:
   1) provide accommodation for the user at a depth value assigned to the vergence point, and
   2) shift depth values relative to the depth value assigned to the vergence point to model depth of field blur for the determined vergence point, the SLM directing the adjusted wavefront of the light of the virtual scene to the user via an exit pupil of the virtual reality headset.

2. The method of claim 1, further comprising:
   generating, by the virtual reality headset, a phase function to be executed by the SLM to adjust the wavefront for the virtual scene based on the determined vergence point and depth values associated with one or more objects in the virtual scene, the phase function causes the SLM to introduce the individual phase delays into the wavefront of the light from the electronic display element that model depth of field blur, the individual phase delays shifting one or more portions of the wavefront for one or more depth values associated with the one or more objects in the virtual scene causing the one or more objects to be out of focus relative to the vergence depth.

3. The method of claim 2, wherein the phase function shifts the light from the electronic display element by introducing the individual phase delays for a target focal plane based on the determined vergence point and depth values of the virtual scene, and wherein the target focal plane is at least one of a continuously-varying shape or a discontinuous surface.

4. The method of claim 3, wherein the individual phase delays are applied based on the depth values relative to a depth value of the determined vergence point and provide the optical defocus to the virtual scene based on each locations depth relative to the determined vergence point.

5. The method of claim 1, wherein each location in the virtual scene is associated with a depth value of a plurality of depth values via virtual scene data, and wherein the focal pattern provides the optical defocus to each location in the virtual scene based on the depth value for each location relative to the depth value of the determined vergence point.

6. The method of claim 5, wherein the focal pattern is generated to adjust a plane of focus of the virtual reality headset to the determined vergence point to provide accommodation at the determined vergence point.

7. The method of claim 5, further comprising:
adjusting a focal length of the optics block at least in part on the determined vergence point for the user, wherein adjusting the focal length of the optics block comprises:
changing a distance between the optics block and the electronic display element to accommodate the determined vergence point.

8. The method of claim 5, wherein the SLM adjusts the focal pattern in response to determining a new vergence point for the user.

9. A method comprising:
receiving, by a virtual reality headset, virtual scene data for displaying a virtual scene on an electronic display element of the virtual reality headset, the virtual scene data including a depth value assigned to each pixel of the electronic display element;
determining a position and an orientation of the virtual reality headset;
determining a portion of the virtual scene to display on the electronic display element based on the position and the orientation of the virtual reality headset;
displaying the portion of the virtual scene on the electronic display element, the virtual reality headset including a transmissive spatial light modulator (SLM) operating in a phase-modulation mode that receives a wavefront of light for the portion of the virtual scene displayed on the electronic display element;
determining an eye position and gaze lines for each eye of a user wearing the virtual reality headset via images of each eye captured by an eye tracking system included in the virtual reality headset;
determining a vergence point for the user in the virtual scene using the eye position and the gaze lines for each eye of the user; and
adjusting, via the SLM, the wavefront of the light received from the electronic display element for the portion of the virtual scene displayed on the electronic display element based on the vergence depth by introducing individual phase delays that adjust the wavefront received from the electronic display element based on depth values assigned to individual pixels of the electronic display element, wherein the individual phase delays that adjust the wavefront cause the SLM to:
1) provide accommodation for the user at a depth value assigned to the vergence point, and
2) shift depth values relative to the depth value assigned to the vergence point to model depth of field blur for the determined vergence point, the individual phase delays shifting one or more portions of the wavefront for one or more depth values associated with one or more objects in the virtual scene causing the one or more objects to be out of focus relative to the vergence point, the SLM directing the adjusted wavefront received from the electronic display element to an exit pupil of the virtual reality headset.

10. The method of claim 9, further comprising:
determining an updated position and an updated orientation of the virtual reality headset;
determining an updated portion of the virtual scene to display on the electronic display element based on the updated position and the updated orientation of the virtual reality headset;
displaying the updated portion of the virtual scene on the electronic display element; and
adjusting, via the SLM, the wavefront for the updated portion of the virtual scene based at least in part on the depth value assigned to each pixel within the updated portion of the virtual scene.

11. The method of claim 9, further comprising:
generating, by the virtual reality headset, a phase function to be executed by the SLM to adjust the wavefront based on the depth value assigned to each pixel within the portion of the virtual scene relative to the vergence depth, the phase function introducing the individual phase delays to one or more portion of the wavefront of the light that model depth of field blur for the portion of the virtual scene from the electronic display element.

12. The method of claim 9, wherein the adjusted wavefront adjusts a plane of focus of the virtual reality headset to a location in the portion of the virtual scene associated with a target viewing area of the electronic display element.

13. A virtual reality headset comprising:
at least one processor;
an eye tracking system including an image capturing element, the eye tracking system configured to determine an eye position of each eye of a user wearing the virtual reality headset and gaze line for each eye of the user;
memory including instructions that, when executed by the at least one processor, cause the at least one processor to:
determine a viewing location of the user within the virtual scene based on an estimated intersection of the gaze lines for each eye;
an electronic display element configured to display a virtual scene; and
an optics block including a transmissive spatial light modulator (SLM) operating in a phase-modulation mode configured to:
receive light from the electronic display element of the virtual scene displayed by the electronic display element, the light including a wavefront, the virtual scene data including a depth value assigned to each pixel of the electronic display element;
adjust the wavefront of the light from the electronic display element displaying the virtual scene by introducing individual phase delays that adjust the wavefront received from the electronic display element based on depth values assigned to individual pixels of the electronic display element, wherein the individual phase delays that adjust the wavefront cause the SLM to:
1) provide accommodation for the user at a depth value assigned to the vergence point, and
2) shift depth values relative to the depth value assigned to the vergence point to model depth of field blur for the viewing location of the user, the individual phase delays shifting one or more portions of the wavefront for one or more depth values associated with one or more objects in the virtual scene causing the one or more objects to be out of focus relative to the viewing location; and
direct the adjusted wavefront of the light to an exit pupil of the virtual reality headset, the adjusted wavefront providing depth of field blur to the virtual scene based on the viewing location of the user.

14. The virtual reality headset of claim 13, wherein the adjusted wavefront moves a plane of focus of the virtual reality headset to the viewing location of the user to provide accommodation for each eye of the user at the viewing location.

15. The virtual reality headset of claim 13, wherein the SLM adjusts the wavefront in response to determining a new viewing location of the user.

16. The virtual reality headset of claim 13, further comprising:
   a varifocal actuation block configured to change a focal length of the optics block based at least in part on the viewing location of the user, wherein the adjusted wavefront provides the depth of field blur to different locations in the virtual scene based on a depth value associated with each of the different locations relative to a depth value associated with the viewing location of the user.

17. The virtual reality headset of claim 13, wherein the virtual reality headset generates a phase function to be executed by the SLM to adjust the wavefront based on depth values associated with the virtual scene including a depth value associated with the viewing location of the user, the phase function introducing the individual phase delays to one or more portions of the wavefront of the light from the electronic display element to adjust the wavefront to provide the depth of field blur.

* * * * *